(12) United States Patent
Hayashida et al.

(10) Patent No.: US 9,069,523 B2
(45) Date of Patent: Jun. 30, 2015

(54) COMPUTER DISPLAY INCLUDING A BEZEL

(71) Applicant: GOOGLE INC., Mountain View, CA (US)

(72) Inventors: Jeffrey Hayashida, San Francisco, CA (US); Michelle Yu, Oakland, CA (US); Ji Heun Lee, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/041,496

(22) Filed: Sep. 30, 2013

(65) Prior Publication Data

US 2015/0092334 A1      Apr. 2, 2015

(51) Int. Cl.
*H05K 5/00* (2006.01)
*H05K 7/00* (2006.01)
*G06F 1/16* (2006.01)
*G02F 1/1333* (2006.01)

(52) U.S. Cl.
CPC ............ *G06F 1/1601* (2013.01); *G06F 1/1605* (2013.01); *G06F 1/1607* (2013.01); *G06F 1/1683* (2013.01); *G02F 2001/133322* (2013.01); *G02F 2001/133317* (2013.01)

(58) Field of Classification Search
CPC ................ G06F 1/1637; G06F 1/1683; G02F 1/133308; G02F 2001/133317; G02F 2001/133322
USPC ............... 361/679.21–679.3, 679.55–679.59; 312/223.1, 223.2; 349/58–60; 455/575.1
See application file for complete search history.

(56) References Cited

U.S. PATENT DOCUMENTS

| | | | |
|---|---|---|---|
| 6,459,591 B2 | 10/2002 | Liu | |
| 6,801,268 B2 | 10/2004 | Huang | |
| 6,826,040 B2 | 11/2004 | Wang | |
| 7,349,040 B2 | 3/2008 | Lee et al. | |
| 7,626,807 B2 | 12/2009 | Hsu | |
| 7,869,205 B2 | 1/2011 | Chin | |
| 7,960,913 B2 | 6/2011 | Yee et al. | |
| 8,058,553 B2 * | 11/2011 | Saito et al. | 174/60 |
| 8,089,758 B2 | 1/2012 | Zhu et al. | |
| 8,270,914 B2 | 9/2012 | Pascolini et al. | |
| 8,339,775 B2 | 12/2012 | Degner et al. | |
| 8,350,984 B2 | 1/2013 | Perry et al. | |
| 8,385,053 B2 * | 2/2013 | Shirasaka et al. | 361/679.01 |
| 8,437,125 B2 | 5/2013 | Jorgensen et al. | |
| 2004/0125268 A1 * | 7/2004 | An | 349/58 |
| 2006/0133018 A1 * | 6/2006 | Okuda | 361/681 |
| 2006/0232564 A1 * | 10/2006 | Nishimura et al. | 345/173 |
| 2008/0112119 A1 | 5/2008 | Wang et al. | |
| 2009/0303137 A1 * | 12/2009 | Kusaka et al. | 343/702 |
| 2010/0238621 A1 * | 9/2010 | Tracy et al. | 361/679.27 |
| 2011/0116217 A1 * | 5/2011 | Lee et al. | 361/679.01 |
| 2011/0216488 A1 * | 9/2011 | Perry et al. | 361/679.01 |
| 2013/0009828 A1 | 1/2013 | Pascolini et al. | |
| 2013/0037228 A1 | 2/2013 | Verschoor et al. | |
| 2013/0070399 A1 * | 3/2013 | Liu et al. | 361/679.01 |
| 2013/0093657 A1 | 4/2013 | Song et al. | |
| 2014/0043744 A1 | 2/2014 | Matsuoka et al. | |

* cited by examiner

*Primary Examiner* — Anthony Haughton
(74) *Attorney, Agent, or Firm* — Brake Hughes Bellermann LLP

(57) ABSTRACT

The computer display includes a display case, a bezel, and a bezel frame in contact with the display case and the bezel, the bezel frame including at least one portion extending away from the bezel to a surface of the display case, the at least one portion defining at least a portion of a cavity.

20 Claims, 13 Drawing Sheets

COMPUTER DISPLAY INCLUDING A BEZEL

FIELD

Embodiments relate to computer displays including bezels and frames.

BACKGROUND

Computer displays typically include a display enclosure with a display panel, a shell and a bezel. Typically the bezel serves two purposes. The first purpose is to fix the display panel to the shell forming the display enclosure. The second purpose is to present an aesthetically pleasing finish such that the inner edges of the display panel and other components associated with the enclosure (e.g., wires and antennas) are hidden from view.

In some display enclosures there is a cavity between an edge of the display panel and an edge of the shell. Typically, the bezel is not supported across this cavity. As a result the bezel and/or any components in the cavity may be damaged if excessive force is applied to the bezel. Therefore, there is a need to provide a bezel that is supported across the cavity between an edge of the display panel and an edge of the shell.

SUMMARY

One embodiment includes a computer display. The computer display includes a display case, a bezel, and a bezel frame in contact with the display case and the bezel, the bezel frame including at least one portion extending away from the bezel to a surface of the display case, the at least one portion defining at least a portion of a cavity.

Another embodiment includes a computer display. The computer display includes a display case, a bezel, and a bezel frame in contact with the display case and the bezel, the bezel frame including at least one portion substantially parallel to the bezel, the at least one portion defining at least a portion of a cavity.

Still another embodiment includes a method. The method includes inserting a wire beside a stanchion formed on a display case, positioning a bezel frame on the stanchion, and fixing a bezel to the bezel frame and the display case.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
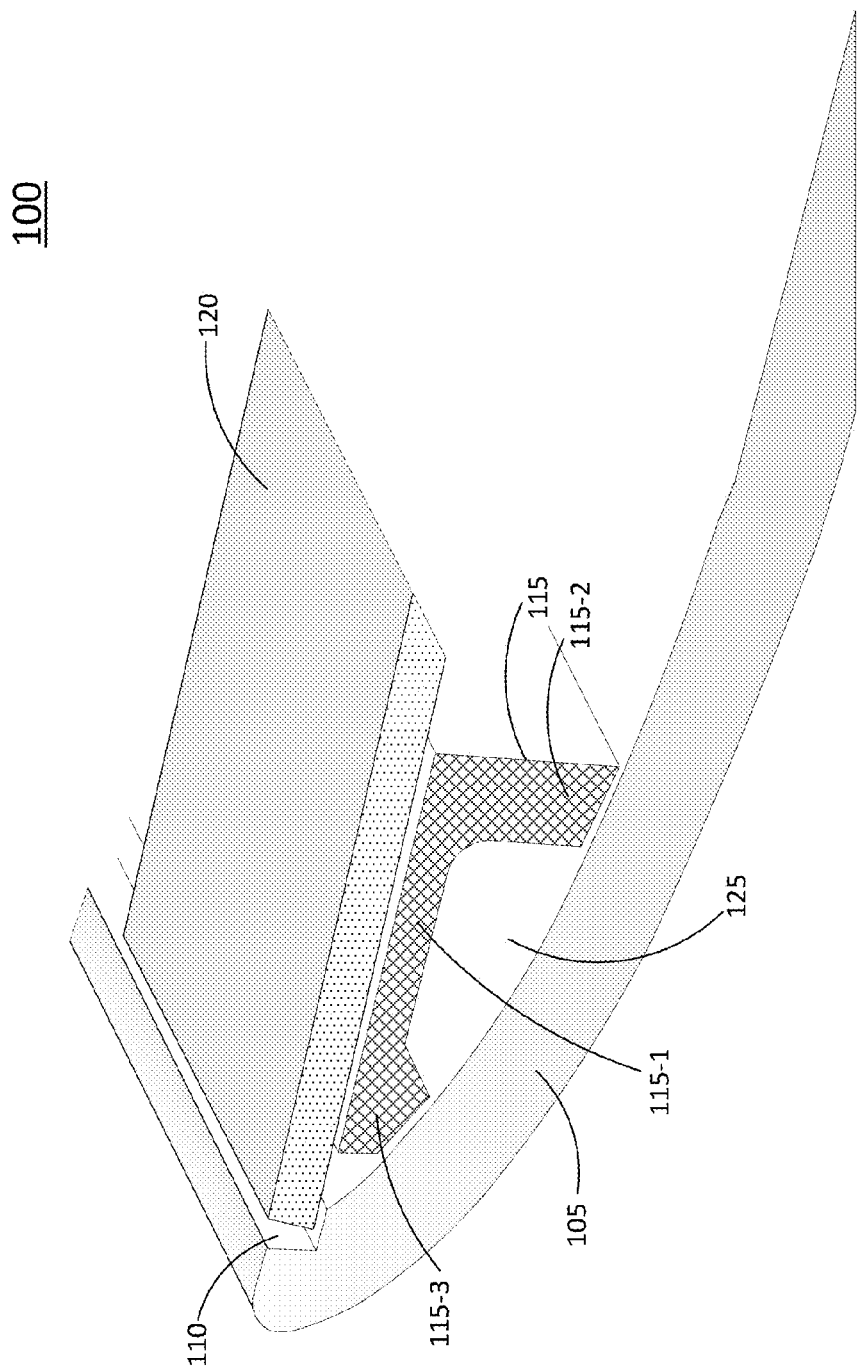
FIG. 1 illustrates a block diagram of a cross-section of a computer display including a bezel according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

FIG. 1 illustrates a block diagram of a cross-section of a computer display including a bezel according to at least one example embodiment. As shown in FIG. 1, the section of a computer display 100 includes a display casing 105, a display casing cut-out 110, a bezel frame 115, and a bezel 120. The bezel frame 115 may include a first portion 115-1, a second portion 115-2 and a third portion 115-3. The first portion 115-1, the second portion 115-2 and the third portion 115-3 may be configured to define a cavity or gap 125.

The first portion 115-1 may be parallel, or substantially parallel to the bezel 120. The first portion 115-1 may be in contact with the bezel 120 and positioned between the display casing 105 and the bezel 120. The second portion 115-2 and the third portion 115-3 may extend away from the first portion 115-1 toward the display casing 105. The second portion 115-2 and the third portion 115-3 may be in contact with a surface (e.g., an inner surface) of the display casing 105. An end of the second portion 115-2 and/or the third portion 115-3 may be angled in order to conform with the shape of the display casing 105. The second portion 115-2 and the third portion 115-3 may be a different length. However, if the display casing 105 (or a portion of the display casing 105) is straight (or substantially straight), the second portion 115-2 and the third portion 115-3 may be a same (or substantially same) length.

The bezel frame 115 may be configured to support the bezel 120 as well as define the cavity 125. The cavity 125 may be configured to provide a route for passing other components (e.g., wires or cables). The cavity 125 may be configured to provide an area for fixing other components (e.g., cameras and antennas). The bezel 120 and/or the bezel frame may be configured to hold or help hold other components (e.g., a display panel) in a fixed position. The bezel 120 may be configured to present an aesthetically pleasing finish for a computer device including the section of a computer display 100. Although the cavity 125 is shown as substantially rectangular, example embodiments are not limited thereto. For example, the cavity 125 may be triangular or circular. As a result, the shape of the first portion 115-1, the second portion 115-2 and the third portion 115-3 may vary accordingly in order to define the desired shape of the cavity 125.

Figure 2:
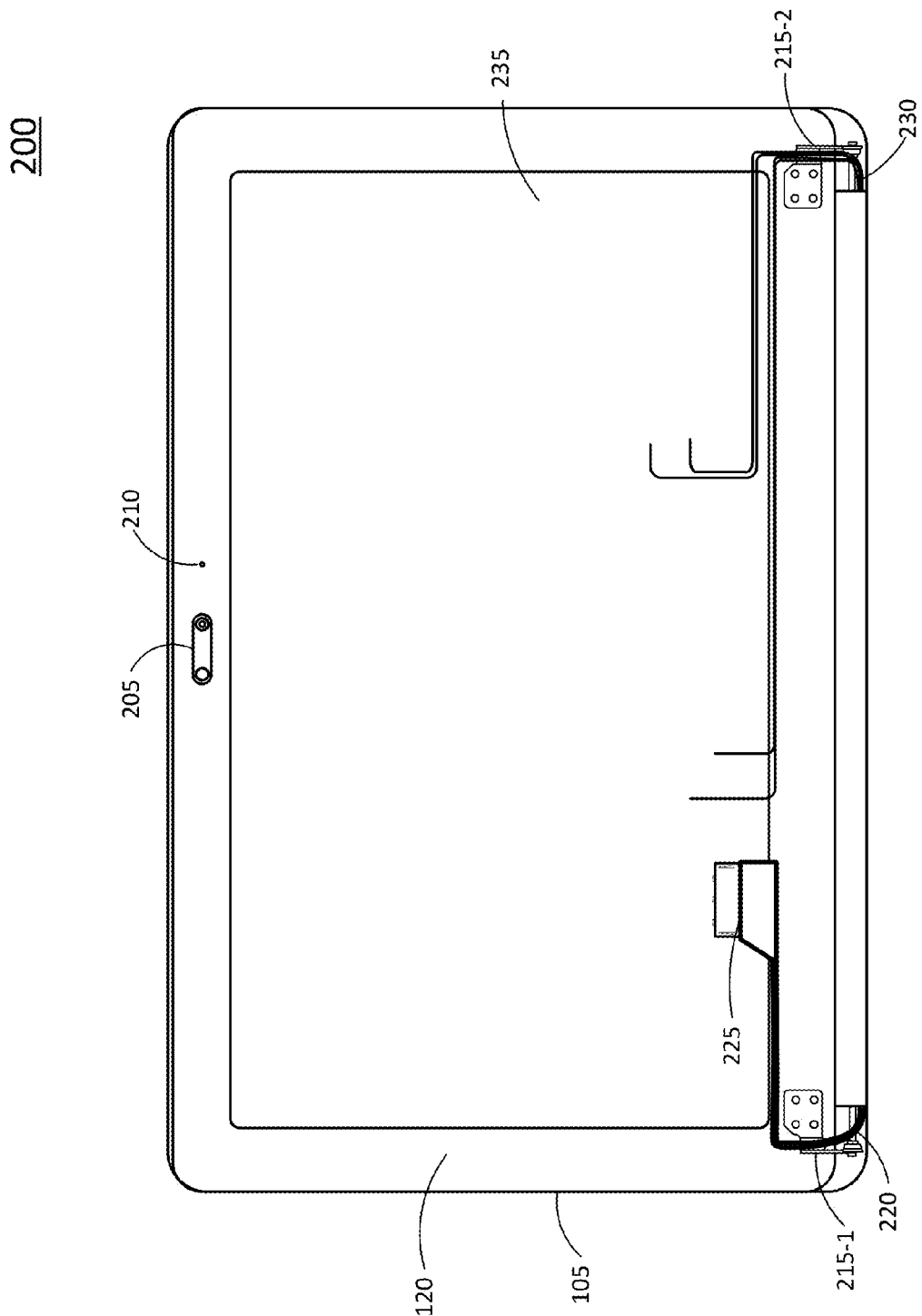
FIG. 2-4 illustrate front views, at different stages of assembly, of a computer display according to at least one example embodiment.
Figure 3:
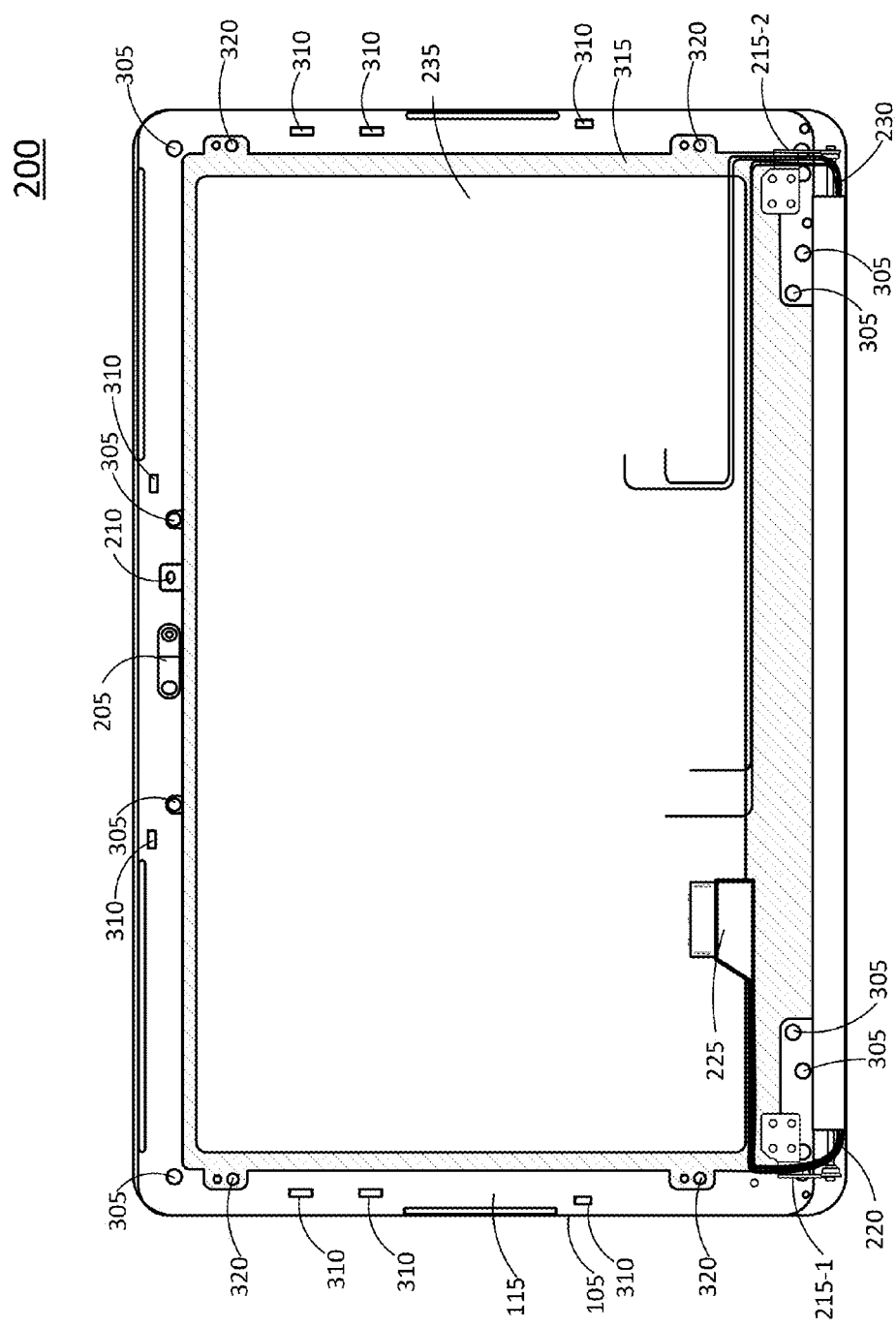
Figure 4:
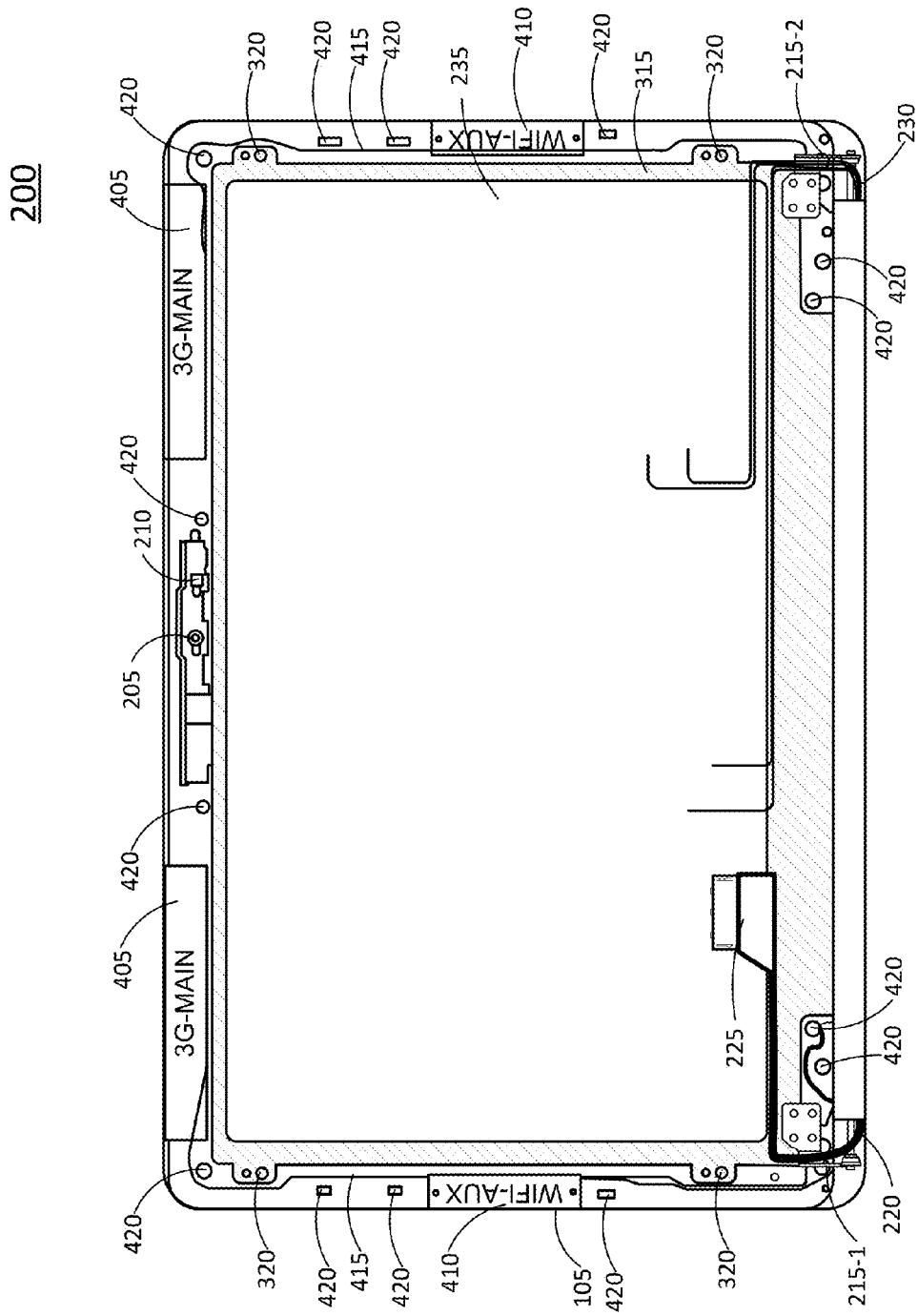

FIG. 2-4 illustrate front views, at different stages of assembly, of a computer display according to at least one example embodiment. FIG. 2 illustrates a front view of the computer display in an assembled condition such that the bezel 120 encloses other elements of the computer display 200. As shown in FIG. 2, the computer display 200 may be associated with, for example, a laptop computer. The computer display 200 may include the display casing 105 and the bezel 120. The computer display 200 may further include a camera 205, a microphone 210, hinges 215-1, 215-2, a first wire bundle 220, a connector 225, a second wire bundle 230, and a display panel 235.

In some embodiments, the display panel 235 can be, for example, a touch sensitive display. In some embodiments, the display panel 235 can be, or can include, for example, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If the display panel 235 is a touch sensitive device, the second wire bundle 230 may include wires connected to, for example, a pressure sensor in order to communicate touch related signals to a processor associated with the computing device. If the display panel 235 is a touch sensitive device, the display panel 235 can function as an input device. For example, the display panel 235 can be configured to display a virtual keyboard (e.g., emulate a keyboard) that can be used by a user as an input device.

In some embodiments, the computer display 200 is included in a traditional laptop-type device with a traditional laptop-type form factor. In some embodiments, the computer display 200 can be (or can be included in), for example, a wired device and/or a wireless device (e.g., Wi-Fi enabled device) and can be, for example, a computing entity (e.g., a personal computing device), a server device (e.g., a web server), a mobile phone, a personal digital assistant (PDA), a tablet device, e-reader, and/or so forth. The computer display 200 can be included in a computing device configured to operate based on one or more platforms (e.g., one or more similar or different platforms) that can include one or more types of hardware, software, firmware, operating systems, runtime libraries, and/or so forth.

The camera 205 may operate to capture images (e.g., still and/or moving images). In some embodiments, the images captured by the camera 205 can be single, static images (such as a photograph) or can be images from a series (or set) of images defining a video (e.g., a progressive scan video, a National Television System Committee (NTSC) video, a Motion Picture Experts Group (MPEG) video). In some embodiments, the series of images (which can define (e.g., generate) the video) can be synchronized with, or otherwise associated with, audio (e.g., an audio signal). The sensor may detect, for example, surrounding light intensity in order to help an image processor (not shown) process images captured by the camera 205. The camera 205 may include elements hidden under the bezel 120. For example, the camera 205 may include elements within the cavity 125. The microphone 210 may be configured to capture audio. The microphone 210 may include elements within the cavity 125.

The first wire bundle 220 and the connector 225 may function together to communicate signals from the computer display 200 to, for example, a base portion (not shown) of a laptop computer. For example, the first wire bundle 220 and the connector 225 may function together to communicate image data as captured by the camera 205 to the base portion of the laptop computer, the base portion including an image processor. The first wire bundle 220 may include one or more wires from the second wire bundle 230. Wires associated with the first wire bundle 220 and/or the second wire bundle 230 may be routed under the bezel 120. For example, the wires associated with the first wire bundle 220 and/or the second wire bundle 230 may be routed through the cavity 125. The base portion of the laptop computer may be attached to the computer display 200 using hinges 215-1, 215-2.

FIG. 3 illustrates a front view of the computer display 200 without the bezel 120. As shown in FIG. 3, the computer display 200 further includes bezel frame fasteners 305, bezel guides 310, a display panel frame 315, and display panel fasteners 320. The bezel frame fasteners 305 may be configured to fasten the bezel frame 115 to the display casing. In addition, the bezel frame fasteners 305 may be configured to help fasten other elements (e.g., camera 205) in a desired position. For example, the bezel frame fasteners 305 may be one or more of a screw, a rivet, a pin and/or a clip.

The bezel guides 310 may be configured to help position the bezel 120 in a desired position. In addition, the bezel guides 310 may be configured to help fix the bezel 120 in a desired position. The bezel guides 310 may be slots, holes, dimples and/or cut-outs in the bezel frame 115 that may extend partially into and/or completely through the bezel frame 115 Alternatively, or in addition to, the bezel guides 310 may be protrusions, projections and/or nodules extending out of the bezel frame 115. The bezel guides 310 may be any combination of slots, holes, dimples and/or cut-outs in the bezel frame 115 and protrusions, projections and/or nodules extending out of the bezel frame 115.

The display panel frame 315 may be configured to frame or wrap the elements of the display panel 235. The display panel frame 315 may include holes through which the display panel fasteners 320 fasten the display panel to the display casing. The display panel fasteners 320 may be one or more of a screw, a rivet, a pin and/or a clip. The display panel frame 315 may be above, below, and/or on the same plane as the bezel frame 115.

FIG. 4 illustrates a front view of the computer display 200 without the bezel 120 and without the bezel frame 115. As shown in FIG. 4, the computer display 200 further includes one or more broadband antennas 405, one or more local area network (LAN) antennas 410, one or more routed wires 415, and bezel frame fastener receptacles 420.

The one or more broadband antennas 405 may be configured to transmit and/or receive 3G (third generation) and 4G (fourth generation) and the like signals. For example, the one or more broadband antennas 405 may provide for wireless communications under various modes or protocols, such as LTE, GSM, SMS, EMS, or MMS messaging, PCS, CDMA, TDMA, PDC, WCDMA, CDMA2000, and/or GPRS, among others. The one or more broadband antennas 405 may be, for example, a printed circuit board antenna. The one or more local area network (LAN) antennas 410 may be configured to transmit and/or receive short range communications signals. The short-range communications may provide for wireless communications under various modes or protocols, such as NFC, Bluetooth and/or Wi-Fi, amongst others. The one or more local area network (LAN) antennas 410 may be, for example, a printed circuit board antenna.

The one or more routed wires 415 may communicate signals from other components (e.g., camera 205) in the computer display 200 to a processor (not shown) via the connector 225. The one or more routed wires 415 may be routed under the bezel 120. For example, the wires associated with the first wire bundle 220 and/or the second wire bundle 230 may be routed through the cavity 125. The bezel frame fastener receptacles 420 may be configured to receive the bezel frame fasteners 305 in order to help fix the bezel frame 115 to the display casing. The bezel frame fastener receptacles 420 may include internal threads, an external and/or internal lip, internal grooves and the like in order to help fix the bezel frame fasteners 305 in a desired position.

Figure 5:
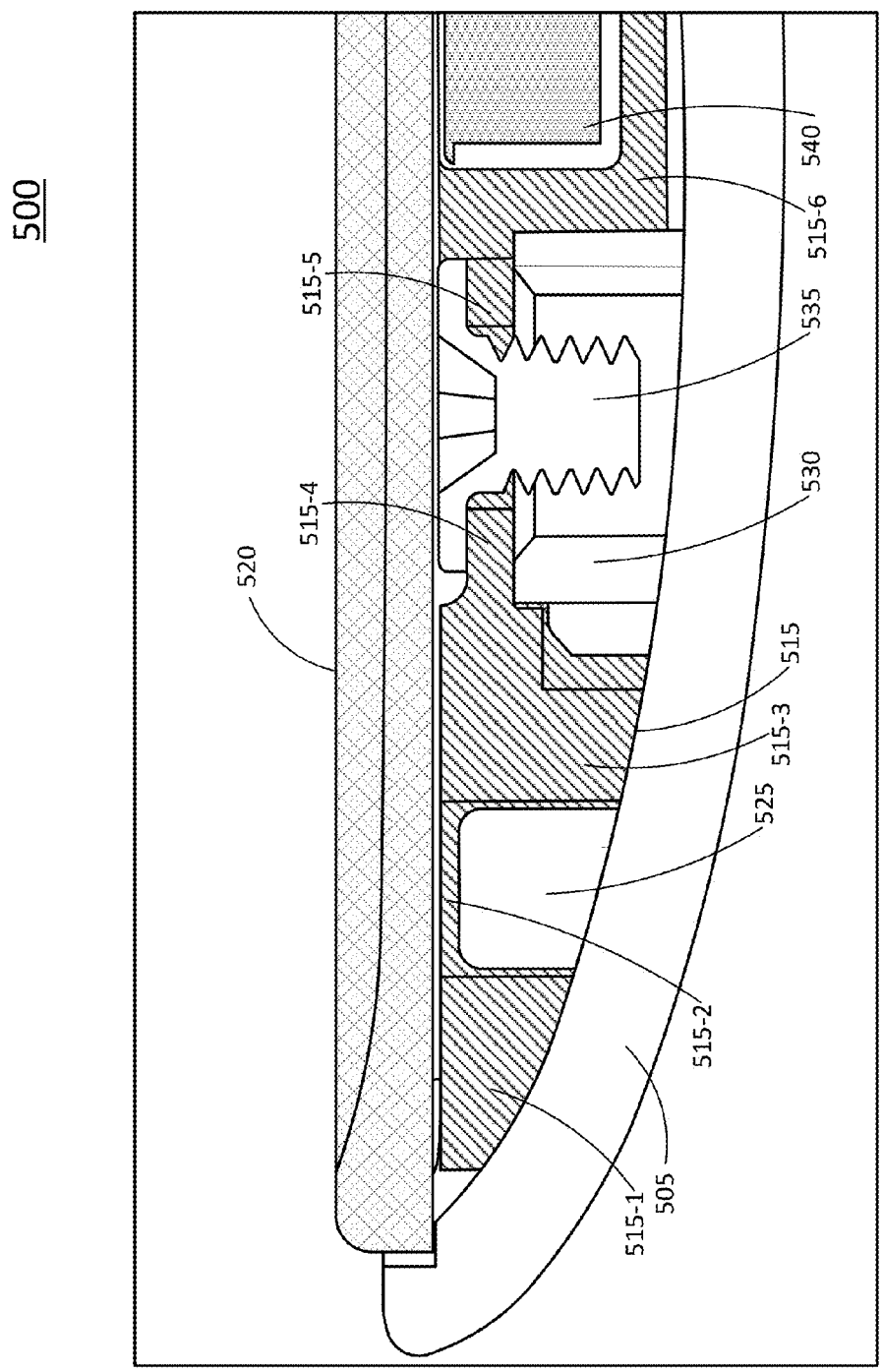
FIG. 5 illustrates another block diagram of a cross-section of a computer display including a bezel according to at least one example embodiment.

FIG. 5 illustrates another block diagram of a cross-section of a computer display including a bezel according to at least one example embodiment. As shown in FIG. 5, the section of a computer display 500 includes a display casing 505, a bezel frame 515, a bezel 520, a bezel frame fastener receptacle 530, a bezel frame fastener 535, and a portion of a display panel frame 540. The bezel frame 515 may include a first portion 515-1, a second portion 515-2 and a third portion 515-3. The first portion 515-1, the second portion 515-2 and the third portion 515-3 may be configured to define a cavity 525. The second portion 515-2 may be parallel, or substantially parallel to the bezel 520. The second portion 515-2 may be in contact with the bezel 520 and positioned between the display casing 505 and the bezel 520. The first portion 515-1 and the third portion 515-3 may extend away from the second portion 515-2 toward the display casing 505. The first portion 515-1 and the third portion 515-3 may be in contact with a surface of the display casing 505. An end of the first portion 515-1 and/or the third portion 515-3 may be angled in order to conform to the shape of the display casing 505. The first portion 515-1 and the third portion 515-3 may be a different length. However, if the display casing 505 (or a portion of the display casing 505) is straight (or substantially straight), the first portion 515-1 and the third portion 515-3 may be a same (or substantially same) length.

Although the cavity 525 is shown as substantially rectangular, example embodiments are not limited thereto. For example, the cavity 525 may be triangular, circular or some other shape. As a result, the shape of the first portion 515-1, the second portion 515-2 and the third portion 515-3 may vary accordingly in order to define the desired shape of the cavity 525.

The bezel frame 515 may include a fourth portion 515-4 and a fifth portion 515-5. The fourth portion 515-4 and the fifth portion 515-5 may define a retaining portion that together with the bezel frame fastener receptacle 530 and bezel frame fastener 535 fix the bezel frame 515 in a desired position. The fourth portion 515-4 and the fifth portion 515-5 the bezel frame fastener receptacle 530 and bezel frame fastener 535 are shown as including mechanical threads to hold the bezel frame 515 in a position with regard to the display casing 505. Although FIG. 5 shows the bezel frame fastener 535 as the mechanism retaining the bezel frame 515 and bezel frame fastener receptacle 530 together, example embodiments are not limited thereto. For example, the fourth portion 515-4 and the fifth portion 515-5 may include a press fit configured to be pushed into the bezel frame fastener receptacle 530 resulting in retention of the bezel frame 515 with bezel frame fastener receptacle 530.

The bezel frame 515 may include a sixth portion 515-6 configured to help position and help fix the display panel frame 540 in a desired position. For example, the sixth portion 515-6 is shown as having an L-shape. The display panel frame may be placed in a position which is contact with the sixth portion 515-6 as shown in FIG. 5. When the bezel 520 is affixed to the bezel frame 515, the bezel frame 515 then prevents the display panel frame 540 from changing its position. Therefore, maintaining the display panel frame 540 in the desired position. Further, the sixth portion 515-6 may be C-shaped. In other words, the sixth portion 515-6 may include an additional portion (not shown) extending from the sixth portion 515-6 and between the bezel 520 and the display panel frame 540. This additional portion (not shown) may be in contact with the display panel frame 540 and/or the bezel 520. Therefore, with the additional portion (not shown), the sixth portion 515-6 may fix the display panel frame 540 in the desired position without the bezel 520 being in place.

The bezel frame 515 may be configured to support the bezel 520 as well as define the cavity 525. The bezel frame 515 may be configured to support the bezel 520 by including portions (e.g., the first portion 515-1 and 515-3) in contact with both the display casing 505 and the bezel 520. For example, if a force is applied to the bezel 520 on the opposite side of the bezel frame 515 in the direction (or substantially in the direction) of the bezel frame 515, the bezel frame 515 may support the bezel 520 such that the bezel 520 does not collapse into a cavity between an edge of the display panel and an edge of the display casing 505. The cavity 525 may be configured to provide a route for passing other components (e.g., cables or wires). The cavity 525 may be configured to provide an area for fixing other components (e.g., cameras and antennas).

The bezel frame fastener receptacle 530 may be fixed to the display casing 505. For example, the bezel frame fastener receptacle 530 may be formed as part of the display casing 505. In other words, the bezel frame fastener receptacle 530 and the display casing 505 may be a molded (e.g., injection molded) plastic structure. The bezel frame fastener 535 may be screwed (as shown), pressed and/or riveted, amongst other fastening mechanisms into the bezel frame fastener receptacle 530 in order to help fix the bezel frame 515 into a desired position.

Figure 6:
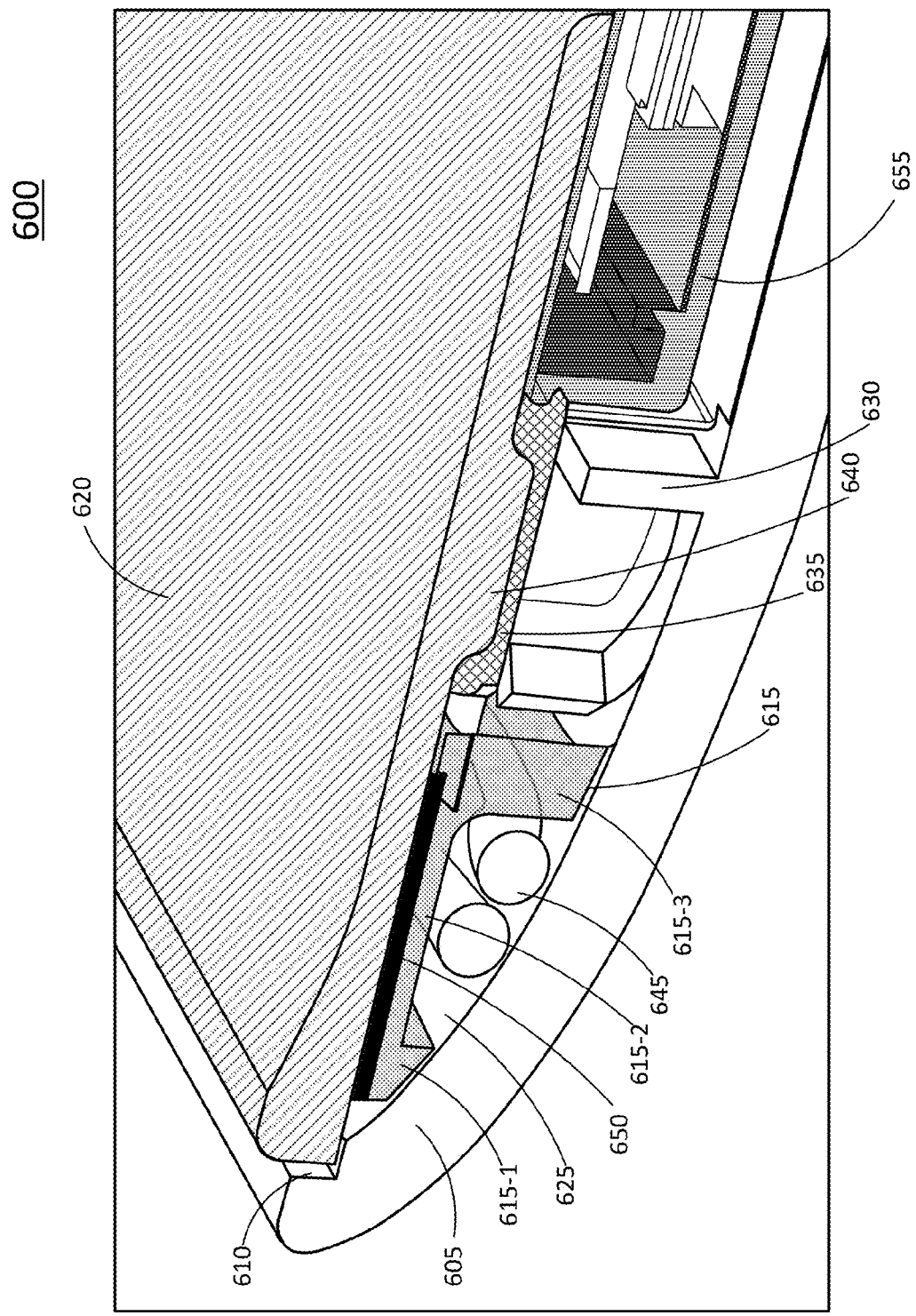
FIG. 6 illustrates still another block diagram of a cross-section of a computer display including a bezel according to at least one example embodiment.

FIG. 6 illustrates still another block diagram of a section of a computer display including a bezel according to at least one example embodiment. As shown in FIG. 6, the section of a computer display 600 includes a display casing 605, a display casing cut-out 610, a bezel frame 615, a bezel 620, a receptacle 630, a guide 635, a protrusion 640, cable(s) 645, an adhesive 650, and a display panel frame 655. The bezel frame 615 may include a first portion 615-1, a second portion 615-2 and a third portion 615-3. The first portion 615-1, the second portion 615-2 and the third portion 615-3 may be configured to define a cavity 625 through which cable(s) 645 may be routed.

The second portion 615-2 may be parallel, or substantially parallel to the bezel 620. The second portion 615-2 may be in contact with the bezel 620 and positioned between the display casing 605 and the bezel 620. The first portion 615-1 and the third portion 615-3 may extend away from the second portion 615-2 toward the display casing 605. The first portion 615-1 and the third portion 615-3 may be in contact with a surface of the display casing 605. An end of the first portion 615-1 and/or the third portion 615-3 may be angled in order to conform to the shape of the display casing 605. The first portion 615-1 and the third portion 615-3 may be a different length. However, if the display casing 605 (or a portion of the display casing 605) is straight (or substantially straight), the first portion 615-1 and the third portion 615-3 may be a same (or substantially same) length.

Although the cavity 625 is shown as substantially rectangular, example embodiments are not limited thereto. For example, the cavity 625 may be triangular, circular or some other shape. As a result, the shape of the first portion 615-1, the second portion 615-2 and the third portion 615-3 may vary accordingly in order to define the desired shape of the cavity 625.

The bezel frame 615 may be configured to support the bezel 620 as well as define the cavity 625. The bezel frame 615 may be configured to support the bezel 620 by including portions (e.g., the first portion 615-1 and 615-3) in contact with both the display casing 605 and the bezel 620. The display casing cut-out 610, together with the bezel frame 615, may help support and help position the bezel 620. The bezel 620 may be affixed to the bezel frame 615 using an adhesive 650 (e.g., glue and/or adhesive tape).

The cavity 625 may be configured to provide a route for passing other components (e.g., cable(s) 645). For example, in an assembly process for the computer display 600 the cable(s) 645 may be loosely placed against a surface of the display casing 605. The bezel frame 615 may be positioned such that the cable(s) 645 are between the first portion 615-1 and 615-3 and the bezel frame 615 is then placed in contact with the display casing 605 resulting in forming the cavity 625. The bezel frame 615 may be fixed in place as discussed above with regard to FIG. 5. As a result, the cavity 625 may be used to define a path through which the cable(s) 645 may be routed within the computer display 600. Further, by routing the cable(s) 645 in cavity 625, the cable(s) 645 may be protected from damage during the remainder of the assembly process for the computer display 600.

Figure 7:
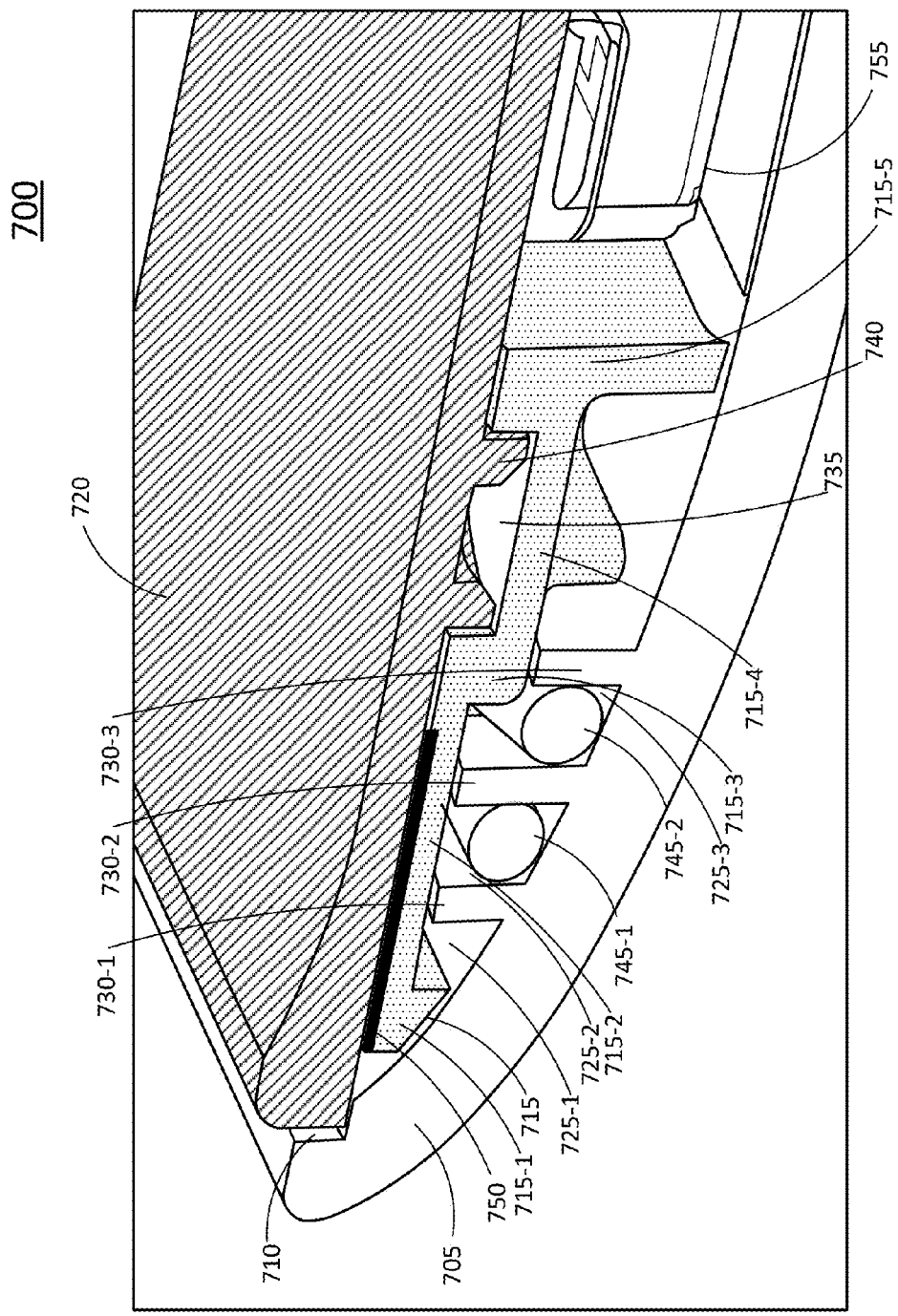
FIG. 7 illustrates yet another block diagram of a cross-section of a computer display including a bezel according to at least one example embodiment.

The bezel 620 may include at least one protrusion 640. For example, the protrusion 640 may be formed as part of the bezel 620. In other words, the bezel 620 and the protrusion 640 may be a molded (e.g., injection molded) plastic structure. The protrusion 640 may fit into the guide 635 in order to help position the bezel 620 in a desired position. Although not shown, the protrusion 640 and the guide 635 may snap together in order to help fix the bezel 620 in the desired position. The guide 635 may be a structural element of a bezel frame fastener (e.g., bezel frame fastener 535 described above). Therefore, the guide 635 together with the receptacle 630 and the protrusion may function together in order to help fix the bezel 620 into a desired position. Other elements and structures may also help fix the bezel 620 into a desired position. For example, adhesive 650 may help fix the bezel 620 into a desired position FIG. 7 illustrates yet another block diagram of a section of a computer display including a bezel according to at least one example embodiment. As shown in FIG. 7, the section of a computer display 700 includes a display casing 705, a top case section 710, a bezel frame 715, a bezel 720, and a display panel frame 755. The display casing 705 includes one or more stanchions 730-1 to 730-3. The bezel frame 715 may include a first portion 715-1, a second portion 715-2 and a third portion 715-3. The second portion 715-2 may be parallel, or substantially parallel to the bezel 720. The second portion 715-2 may be positioned between the display casing 705 and the bezel 720. The first portion 715-1 and the third portion 715-3 may extend away from the second portion 715-2 toward the display casing 705. The first portion 715-1 and the third portion 715-3 may be in contact with a surface of the display casing 705. An end of the first portion 715-1 and/or the third portion 715-3 may be angled in order to conform to the shape of the display casing 705.

The first portion 715-1, the second portion 715-2 and the third portion 715-3 may define a cavity having a first volume. The first portion 715-1, the second portion 715-2, the third portion 715-3, and one or more stanchions 730-1 to 730-3 may be configured to define one or more cavities 725-1 to 725-3 each having a volume less than the first volume. The one or more cavities 725-1 to 725-3 may oriented or positioned within the cavity defined by the first portion 715-1, the second portion 715-2 and the third portion 715-3. The one or more cavities 725-1 to 725-3 may define paths through which cable(s) 740-1 and 740-2 may be routed. The bezel frame 715 may further include a fourth portion 715-4, a fifth portion 715-5. The bezel 720 may include a protrusion 740. The third portion 715-3, the fourth portion 715-4, and the fifth portion 715-5 may define a receptacle 735 in which the protrusion may be inserted.

The bezel frame 715 may be configured to support the bezel 720 as well as help define the cavities 725-1 to 725-3. The bezel frame 715 may be configured to support the bezel 720 by including portions (e.g., the first portion 715-1 and 715-7) in contact with both the display casing 705 and/or the stanchions 730-1 to 730-3 and the bezel 720. The display casing cut-out 710, together with the bezel frame 715, may help support and help position the bezel 720. The bezel 720 may be fixed to the bezel frame 715 using an adhesive 750 (e.g., glue and/or adhesive tape).

The cavities 725-1 to 725-3 may be configured to provide a route for passing other components (e.g., cable(s) 745-1 and 745-2). For example, in an assembly process for the computer display 700 the cables 745-1 and 745-2 may be placed against a surface of the display casing 705 in the cavity 725-1 and 725-2. The bezel frame 715 may be positioned on the one or more stanchions 730-1 to 730-3. The bezel frame 715 may be fixed in place as discussed above with regard to FIG. 5. As a result, the cavity 725-1 and 725-2 may be used to define a path through which the cables 745-1 and 745-2 may be routed within the computer display 700. Further, by routing the cables 745-1 and 745-2 in cavity 725-1 and 725-2 and positioning the bezel frame as described, the cables 745-1 and 745-2 may be protected from damage during the remainder of the assembly process for the computer display 700.

The stanchions 730-1 to 730-3 may extend away from the display casing 705 toward the second portion 715-2 (if the bezel frame is installed). The stanchions 730-1 to 730-3 may be parallel or substantially parallel to one or more of the first portion 715-1, the third portion 715-3 and the fifth portion 715-5. The stanchions 730-1 to 730-3 may be perpendicular to or substantially perpendicular to one or more of the second portion 715-2 and the fourth portion 715-5. However, the stanchions 730-1 to 730-3 may be at an angle such that the cavities 725-1 to 725-3 are some other shape (e.g., a triangular shape) than shown in FIG. 7. The stanchions 730-1 to 730-3 may be formed as part of the display casing 705. In other words, the display casing 705 and the stanchions 730-1 to 730-3 may be a molded (e.g., injection molded) plastic structure. The cavities 725-1 to 725-3 between the stanchions 730-1 to 730-3 may guide the cable(s) 745-1 and 745-2 in order to help position the cable(s) 745-1 and 745-2 in a desired position.

The bezel 720 may include at least one protrusion 740. For example, the protrusion 740 may be formed as part of the bezel 720. In other words, the bezel 720 and the protrusion 740 may be a molded (e.g., injection molded) plastic structure. The protrusion 740 may fit into the receptacle 735 in order to help position the bezel 720 in a desired position. Although not shown, the protrusion 740 and the receptacle 735 may snap together in order to help fix the bezel 720 in the desired position.

Figure 8:
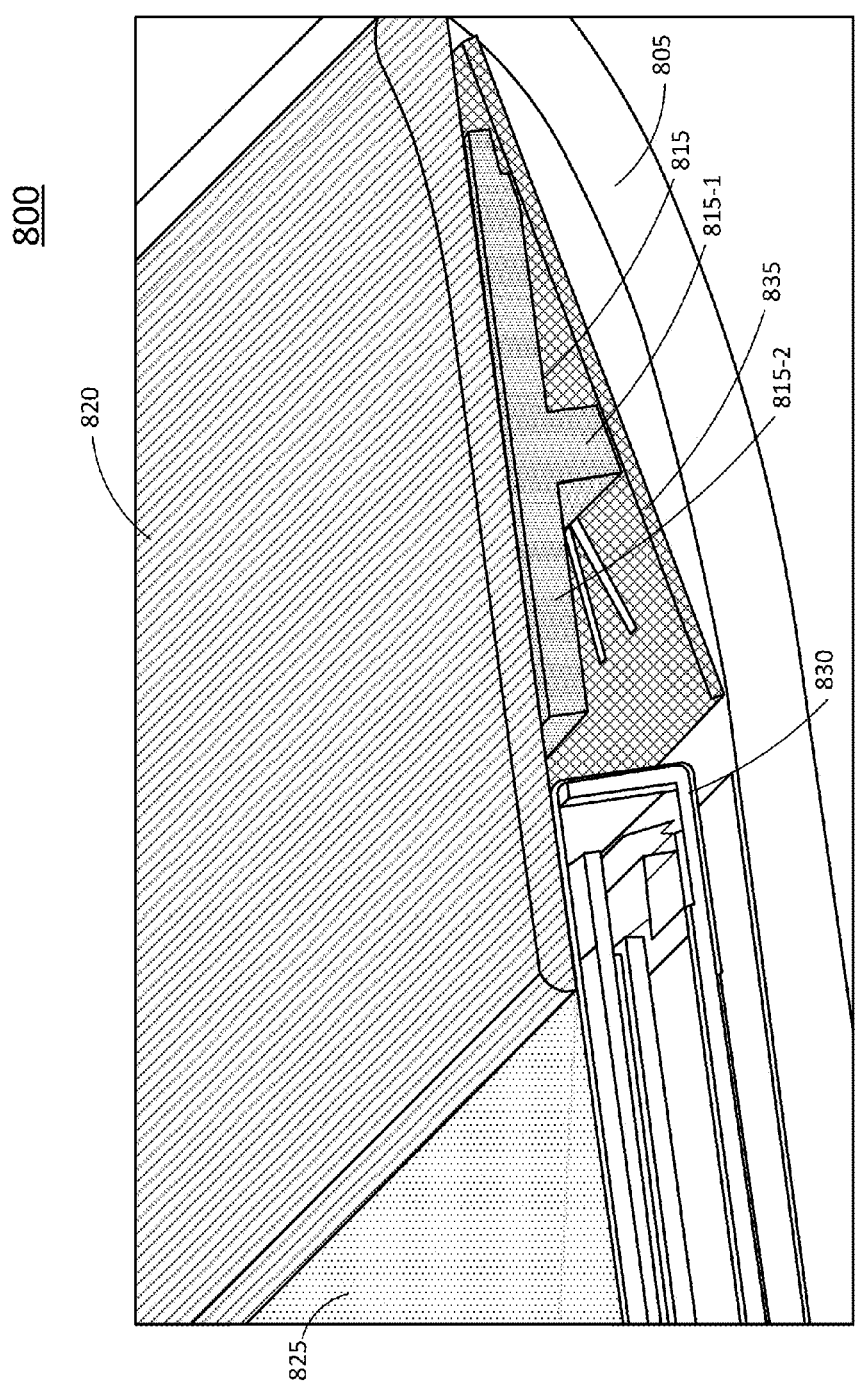
FIG. 8 illustrates another block diagram of a cross-section of a computer display including a bezel according to at least one example embodiment.

FIG. 8 illustrates another block diagram of a section of a computer display including a bezel according to at least one example embodiment. As shown in FIG. 8, the section of a computer display 800 includes a display casing 805, a bezel frame 815, a bezel 820, a display panel 825, a display panel frame 830, and an antenna 835. The bezel frame 815 may include a first portion 815-1 and a second portion 815-2. The second portion 815-2 may be parallel, or substantially parallel to the bezel 820. The second portion 815-2 may be positioned between the display casing 805 and the bezel 820. The antenna 835 may be positioned between the display casing 805 and the second portion 815-2. The first portion 815-1 may extend away from the second portion 815-2 toward the antenna 835 and the display casing 705. The first portion 815-1 may be in contact with a surface of the antenna 835. An end of the first portion 815-1 may be angled in order to conform to an angle of the antenna 835.

The first portion 815-1 and the second portion 815-2 may support the bezel 820 and help fix the antenna 835 in a desired position. For example, the antenna 835 may be placed at an angle with a gap between the display casing 805 and on side of the antenna 835. The bezel frame 815 may be positioned such that the first portion 815-1 and one end of the second portion 815-2 is in contact with the antenna 835 as shown. The bezel frame 815 may be fixed in place as discussed above with regard to FIG. 5. The result is that the antenna 835 may be wedged into place such that the antenna 835 is fixed in a desired position.

The bezel frame 815 may be configured to support the bezel 820 by including portions (e.g., the first portion 815-1 and 815-2) in contact with the bezel 820 and the antenna 835 which is in contact with the display casing 805. The antenna 835 may be a printed circuit board (PCB) antenna. The antenna may be sufficiently structured (e.g., rigid) to provide the aforementioned support. Alternatively, the antenna 835 may be a flexible PCB that, when placed in contact with the display casing 805, takes on the shape of the display casing 805. In such a configuration, the display casing 805 provides structural support for the first portion 815-1 when the first portion 815-1 is in contact with the antenna 835.

FIG. 8 shows the first portion 815-1 somewhat centered on the second portion 815-2. However, example embodiments are not limited thereto. For example, the first portion 815-1 may be positioned toward an end (e.g., an end closest to the display panel frame 830). Further, the first portion 815-1 and the second portion 815-2 may be combined into a substantially single portion in a wedge like shape.

Alternatively, the bezel frame 815 may only help fix the antenna 835 in the desired position. In other words, the bezel frame 815 (in the area of the computer display 800 including the antenna 835) may not be configured to support the bezel 820 to the extent that other portions of a bezel frame, in contact with both the bezel 820 and display casing 805, may be configured to support the bezel 820. Even in this alternative embodiment, a bezel frame (as a whole) according to example embodiments is configured to support the bezel 820.

Figure 9:
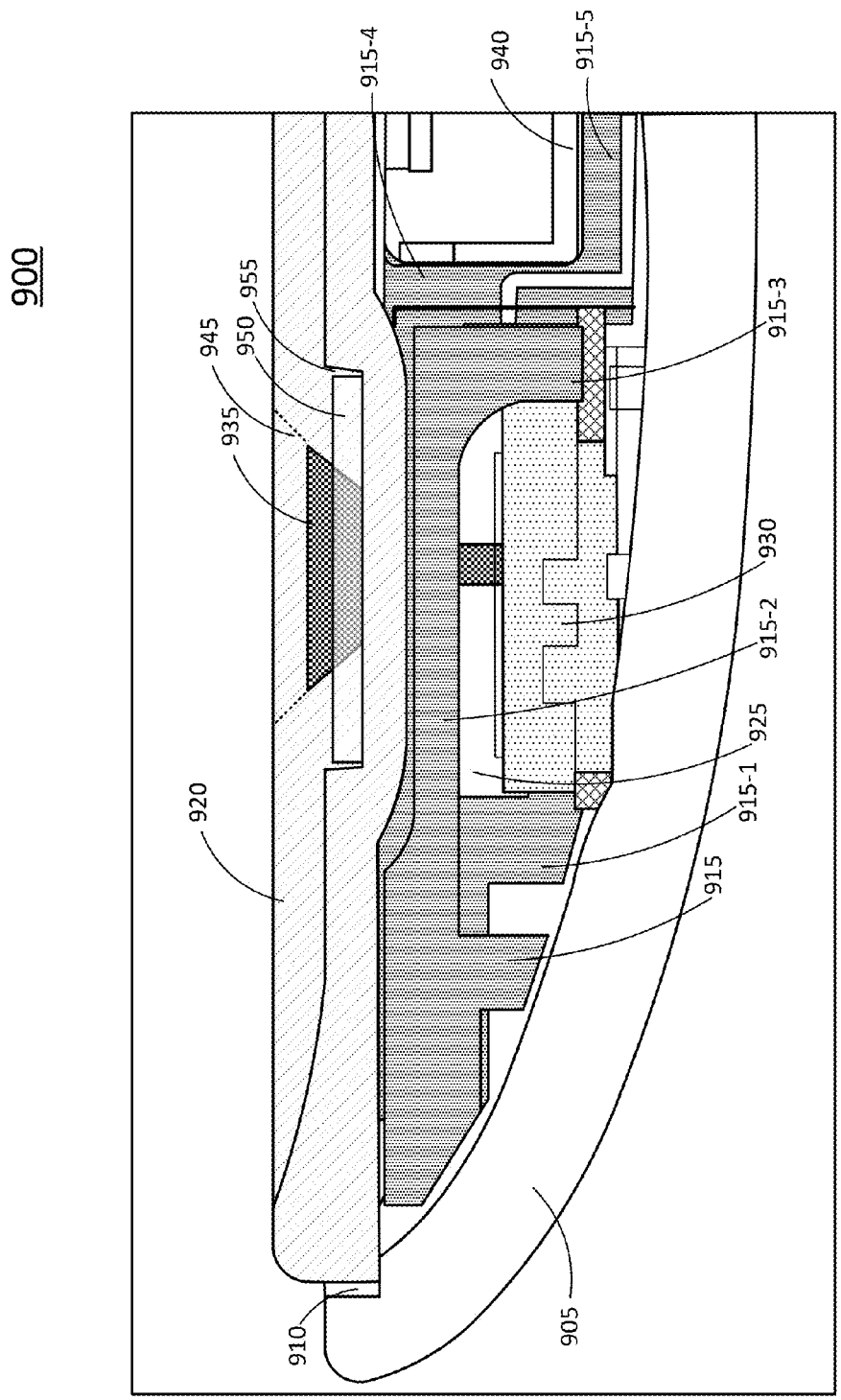
FIG. 9 illustrates still another block diagram of a cross-section of a computer display including a bezel according to at least one example embodiment.

FIG. 9 illustrates still another block diagram of a section of a computer display including a bezel according to at least one example embodiment. As shown in FIG. 9, the section of a computer display 900 includes a display casing 905, a display casing cut-out 910, a bezel frame 915, a bezel 920, a camera module 930, a camera lens 935, and a display panel frame 940. The bezel frame 915 may include a first portion 915-1, a second portion 915-2 and a third portion 915-3. The first portion 915-1, the second portion 915-2 and the third portion 915-3 may be configured to define a cavity 925 configured to help fix the camera module 930 in a desired position.

The bezel frame 915 may include a fourth portion 915-4 and a fifth portion 915-5 configured to help position and help fix the display panel frame 940 in a desired position. For example, the fourth portion 915-4 and the fifth portion 915-5 are shown together as having an L-shape. The display panel frame may be placed in a position which is contact with the fourth portion 915-4 and the fifth portion 915-5 as shown in FIG. 9. When the bezel 920 is affixed to the bezel frame 915, the bezel frame 915 then prevents the display panel frame 940 from changing its position. Therefore, maintaining the display panel frame 940 in the desired position. Further, the fourth portion 915-4 and the fifth portion 915-5 together may be C-shaped. In other words, the fourth portion 915-4 may include an additional portion (not shown) extending from the fourth portion 915-4 and between the bezel 920 and the display panel frame 940. This additional portion (not shown) may be in contact with the display panel frame 940 and/or the bezel 920. Therefore, with the additional portion (not shown), the fourth portion 915-4 and the fifth portion 915-5 together may fix the display panel frame 940 in the desired position without the bezel 920 being in place.

The bezel frame 915 may be configured to support the bezel 920 as well as help fix the camera module 930 in a desired position. The bezel frame may help fix the camera module 930 in a desired position by having one or more of the first portion 915-1 and the third portion 915-3 in contact with or partially in contact with the camera module. As a result, the bezel frame 915 may apply a force on the camera module 930 directed toward the display casing 905 to fix, or help fix, the camera module 930 in the desired position. Alternatively, or in addition to, a cavity defined by the first portion 915-1 and the third portion 915-3 (as shown on the left and right of the camera module 930) and by the second portion 915-2 and the display casing 905 (as shown on the top and bottom of the camera module 930) may be sized based on the size of the camera module 930. The camera module 930 may then be placed in the cavity and the bezel frame 915 may be fixed in place as discussed above with regard to FIG. 5, resulting in the camera module 930 being fixed in the desired position.

The bezel frame 915 may be configured to support the bezel 920 by including portions (e.g., the first portion 915-1 and 915-2) in contact with the bezel 920 and the display casing 905. The display casing cut-out 910, together with the bezel frame 915, may help support and help position the bezel 920. For example, the display casing cut-out 910 may support one end of the bezel 920 in the display casing 905. Further, the second portion 915-2 may be parallel, or substantially parallel to the bezel 920. The second portion 915-2 may be in contact with the bezel 920 and positioned between the display casing 905 and the bezel 920. The first portion 915-1 and the third portion 915-3 may extend away from the second portion 915-2 toward the display casing 905. The first portion 915-1 and the third portion 915-3 may be in contact with a surface of the display casing 905 (or alternatively, a portion of the camera module 930, which is in turn in contact with the display casing 905). An end of the first portion 915-1 and/or the third portion 915-3 may be angled in order to conform with the shape of the display casing 905. The first portion 915-1 and the third portion 915-3 may be a different length. However, if the display casing 905 (or a portion of the display casing 905) is straight (or substantially straight), the first portion 915-1 and the third portion 915-3 may be a same (or substantially same) length.

The bezel 920 may include a cut-out 945 defining a position through which the camera lens 935 may be positioned. The camera lens 935 may be fixed in place with a fixing structure 950. The fixing structure 950 may be, for example, a press fit held in place by a cavity 955 formed in the bezel 920.

Figure 10:
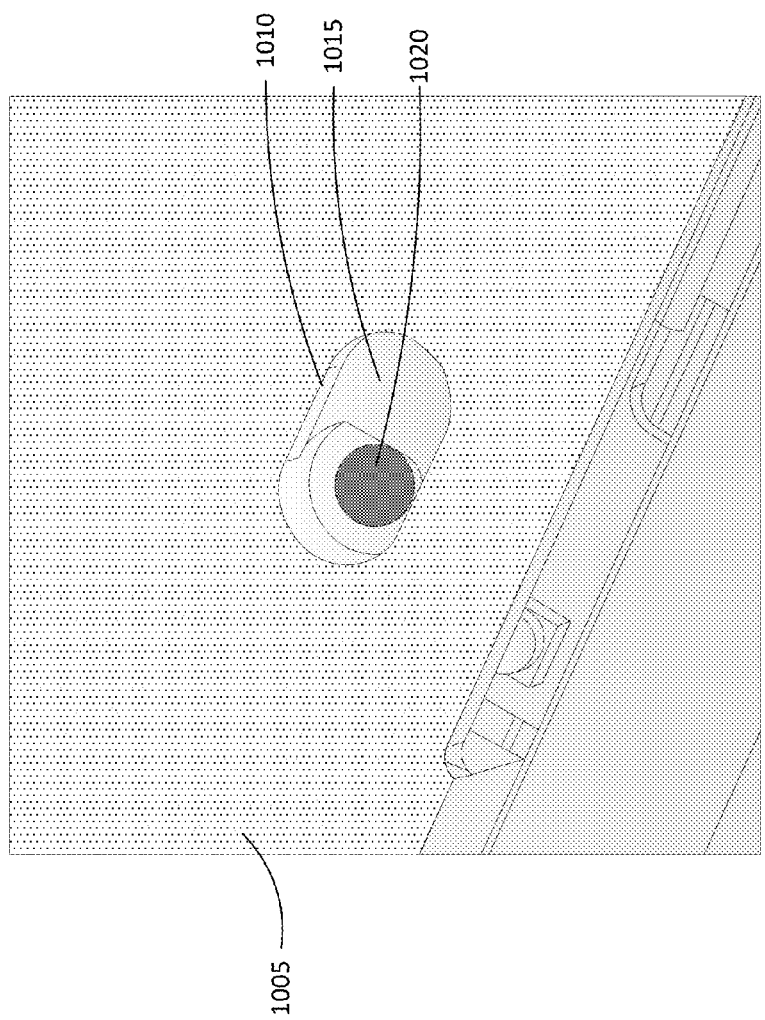
FIG. 10 illustrates view of a computer display including a bezel with a microphone according to at least one example embodiment.

FIG. 10 illustrates view of a computer display including a bezel with a microphone according to at least one example embodiment. As shown in FIG. 10, a section of a bezel 1005 includes an inlayed cutout 1010. The inlayed cutout 1010 may be configured to sound port into the microphone (e.g., microphone 210). For example, the inlayed cutout may include a pocket 1015 and a hole 1020 in the section of the bezel 1005. The hole 1020 may lead to an input for the microphone (e.g., microphone 210). The hole 1020 may be offset from the pocket 1050 so a user is prevented from poking through the hole 1020 and damaging the microphone.

Figure 11:
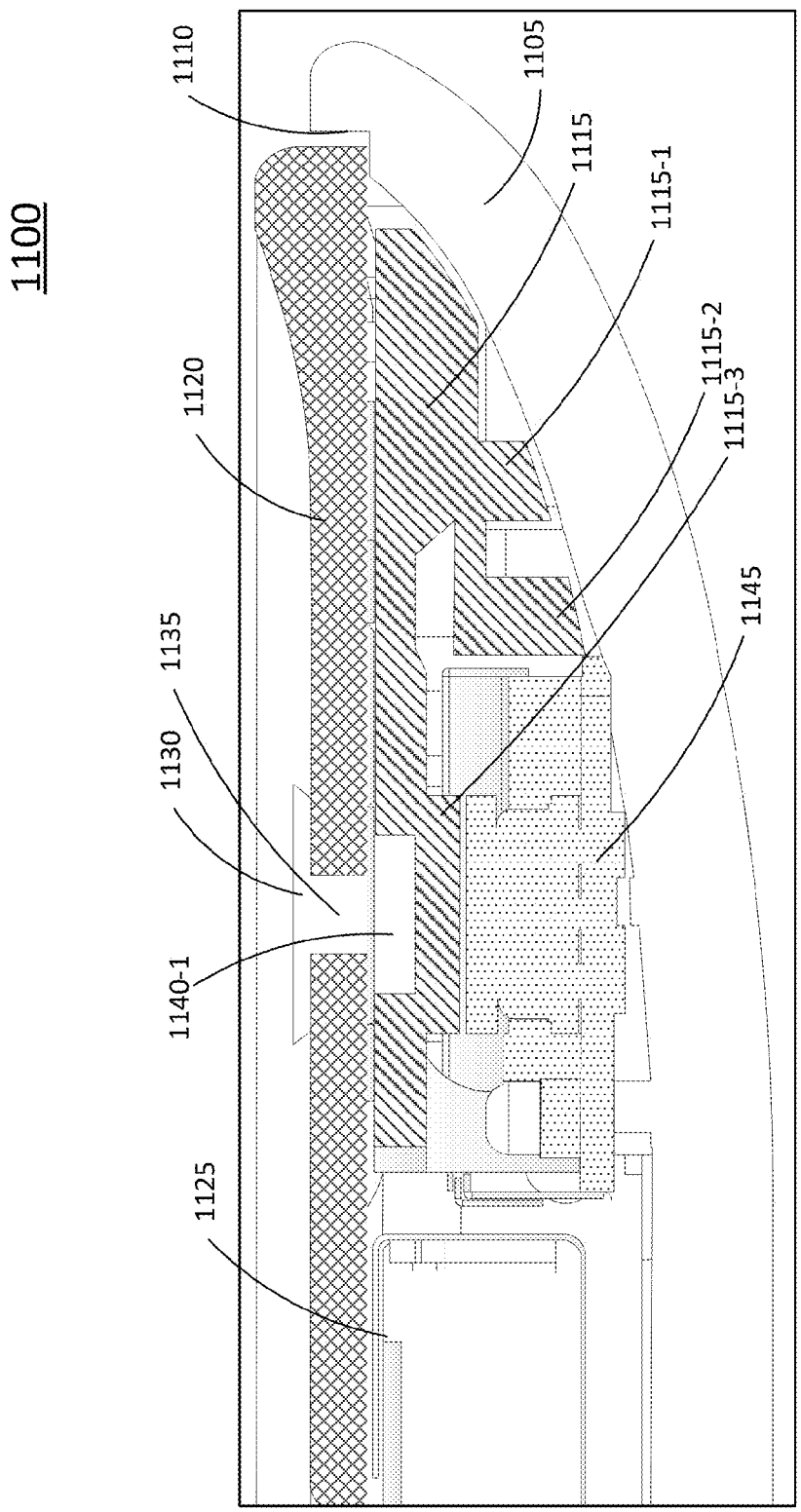
FIG. 11 illustrates block diagram of a cross-section of a computer display including a bezel with a microphone according to at least one example embodiment.

FIG. 11 illustrates block diagram of a cross-section of a computer display including a bezel with a microphone according to at least one example embodiment. As shown in FIG. 11, the section of a computer display 1100 includes a display casing 1105, a display casing cut-out 1110, a bezel frame 1115, a bezel 1120, a display panel frame 1125, an inlayed cutout 1130, a hole 1135, a pocket 1140-1, and a microphone module 1145. The bezel frame 1115 may include a first portion 1115-1, a second portion 1115-2 and a third portion 1115-3. The first portion 1115-1 and the second portion 1115-2 and the third portion 1115-3 may be configured to define a cavity configured to help fix the microphone module 1145 in a desired position.

Figure 12:
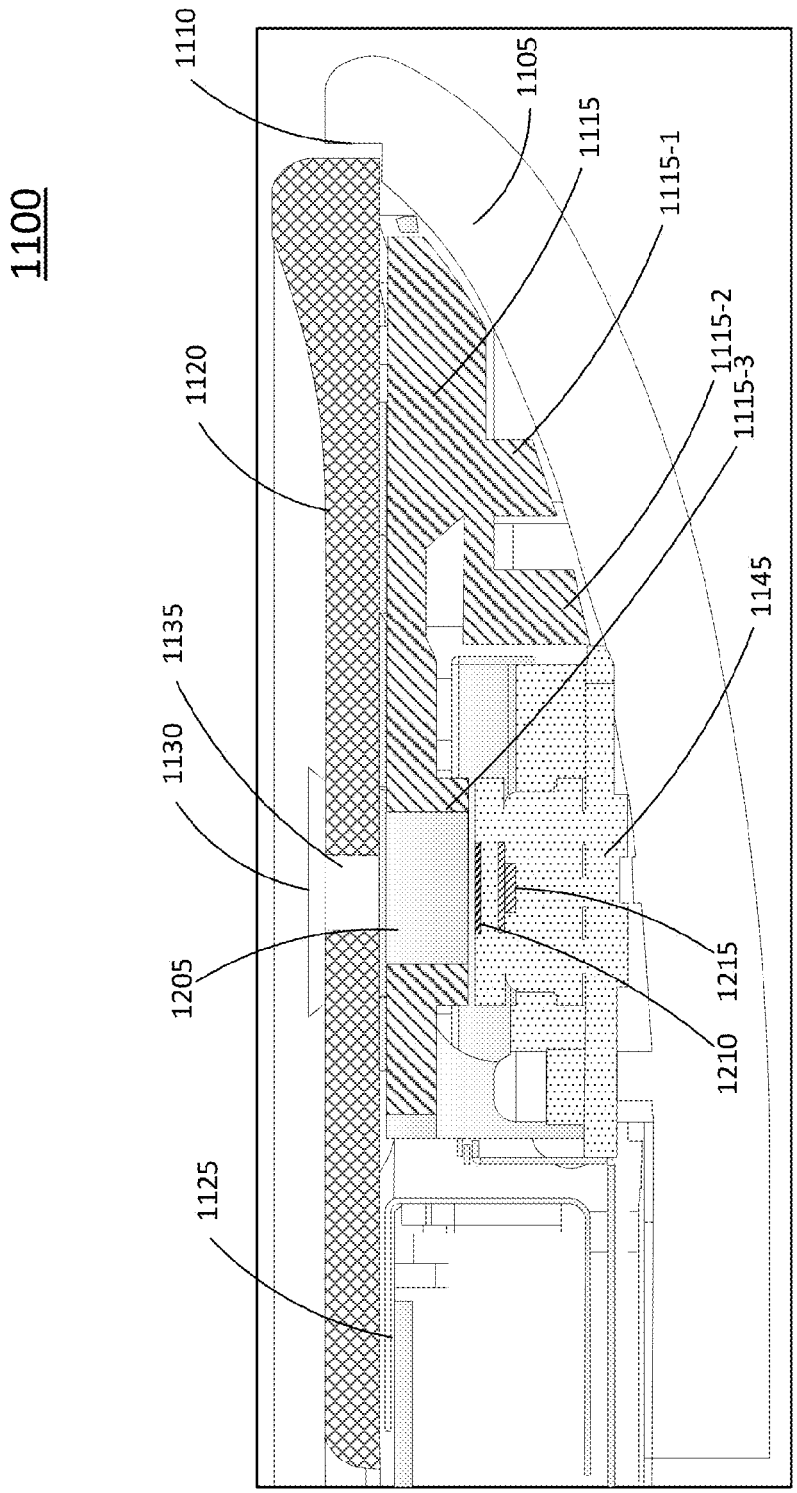
FIG. 12 illustrates another block diagram of a cross-section of a computer display including a bezel with a microphone according to at least one example embodiment.

FIG. 12 illustrates another block diagram of the cross-section of the computer display including a bezel with a microphone shown in FIG. 11 according to at least one example embodiment. As shown in FIG. 12, the section of a computer display 1100 further includes a hole 1205, a first input element of a microphone module 1210 and a second element of a microphone module 1215. In some implementations, the first input element of a microphone module 1210 and the second element of a microphone module 1215 are combined into a single input element. The hole 1135, the pocket 1145 (cut from the bezel frame 1115) and the hole 1205 (cut through the bezel frame 1115) may be offset so a user is prevented from poking through the hole 1135 and damaging the microphone module 1145. The hole 1135, the pocket 1140 and the hole 1205 may define a sound port into the microphone module 1145 from an external area of the computer display.

The bezel frames (e.g., bezel frames 515, 615, 715, 815 and/or 915) discussed above with regard to FIGS. 5-12, may be portions of a single bezel frame. In other words, the bezel frames may be formed as a solitary structure with portions configured with cavities configured to route cables or wires, portions configured to support and/or position other device (e.g., antenna(s), microphones, and/or camera(s)). The bezel may be formed of a metal (e.g., aluminum) or plastic (e.g., molded plastic). The bezel may be positioned around one or more sides of a computer display. For example, there may be a separate bezel for each side (e.g., top, bottom, left and right) of the computer display. For example, there may be a bezel for two connecting sides (e.g., top and left and/or bottom and right) of the computer display. For example, there may be a bezel for three connecting sides (e.g., top, right and left) of the computer display.

Figure 13:
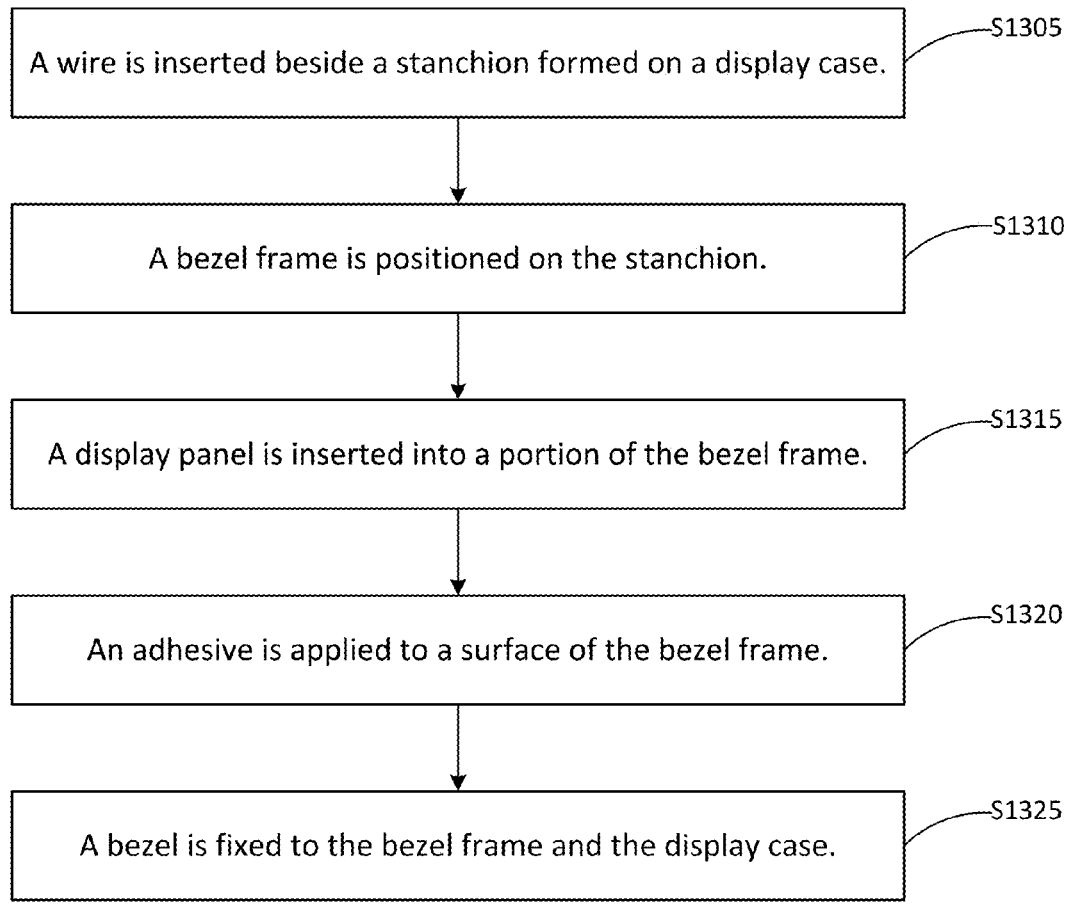
FIG. 13 illustrates a method of assembling a computer display according to at least one example embodiment.

FIG. 13 illustrates a method of assembling a computer display according to at least one example embodiment. As shown in FIG. 13, in step S1305 a wire is inserted beside a stanchion formed on a display case. For example, as shown in FIG. 7, a wire (e.g., cable 745-2) may be inserted beside stanchion 730-3.

In step S1310 a bezel frame is positioned on the stanchion. For example, as shown in FIG. 7, bezel frame 715 is fixed on stanchion(s) 730-1, 730-2 and/or 730-3. Further, as shown in FIG. 5, bezel frame 515 is fixed in position using bezel frame fastener 535 and bezel frame fastener receptacle 530. For example, bezel frame fastener 535 may be screwed (as shown), pressed and/or riveted, amongst other fastening mechanisms into the bezel frame fastener receptacle 530 in order to help fix the bezel frame 515 into a desired position.

In step S1315 a display panel is inserted into a portion of the bezel frame. For example, as shown in FIGS. 2 and 5, the display panel (e.g., display panel 235) may include a display panel frame 540 which may be inserted into a portion (e.g., bezel frame portion 515-6) of the bezel frame 515.

In step S1320 an adhesive is applied to a surface of the bezel frame. For example, as shown in FIG. 7, an adhesive 750 may be inserted between the bezel 720 and the bezel frame 715. The adhesive 750 may help fix the bezel 720 to the bezel frame 715.

In step S1325 a bezel is affixed to the bezel frame and the display case. For example, as shown in FIG. 7, the bezel 720 is fixed to the bezel frame 715 using the adhesive 750. Alternatively, or in addition to, the bezel 720 may be fixed to the bezel frame 715 using the protrusion 740 together with the receptacle 735.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A computer display comprising:
    a display case;
    a bezel; and
    a bezel frame entirely in an interior of the computer display and extending along an entire periphery of the display case and the bezel,
    the bezel frame is in contact with the display case and includes at least one portion extending away from the bezel to a surface of the display case, the at least one portion having a surface in direct contact with the display case along the entire periphery of the display case, the at least one portion defining at least a portion of a cavity between the display case and the bezel,
    the bezel frame has a surface in contact with the bezel along the entire periphery of the bezel.

2. The computer display of claim 1, wherein the cavity defines a path through which a wire is routed.

3. The computer display of claim 1, further comprising a camera module disposed in the cavity, wherein the bezel frame is configured to position and support the camera module.

4. The computer display of claim 1, further comprising an antenna disposed in the cavity, wherein the bezel frame is configured to position and support the antenna.

5. The computer display of claim 1, further comprising a display panel, wherein the bezel frame is configured to position and support the display panel.

6. The computer display of claim 1, wherein the bezel is affixed to the bezel frame with an adhesive.

7. The computer display of claim 1, wherein display case includes a cut-out on which the bezel is positioned.

8. The computer display of claim 1, wherein the bezel includes a protrusion and the bezel frame includes a receptacle configured to receive the protrusion.

9. The computer display of claim 1, wherein the bezel includes a protrusion and the bezel frame includes a receptacle, the protrusion and the receptacle configured to snap together to fix the bezel in a position.

10. The computer display of claim 1, further comprising a microphone module, wherein
    the bezel includes a first hole,
    the bezel frame includes a pocket and a second hole such that the second hole is offset from the first hole, and
    the first hole, the pocket and the second hole define a sound port into the microphone module.

11. The computer display of claim 1, further comprising a camera module, wherein
    the bezel frame includes a first portion defining a first cavity including a cable associated with the camera module, and
    the bezel frame includes a second portion defining a second cavity including the camera.

12. The computer display of claim 1, further comprising an antenna, wherein
    the bezel frame includes a first portion defining a first cavity including a cable associated with the antenna, and
    the bezel frame includes a second portion defining a second cavity including the antenna.

13. A computer display comprising:
    a display case;
    a bezel; and
    a bezel frame entirely in an interior of the computer display and extending along an entire periphery of the display case and the bezel,
    the bezel frame including at least one first portion substantially parallel to the bezel, the at least one first portion having a surface in contact with the bezel along the entire periphery of the bezel
    the bezel frame including at least one second portion substantially perpendicular to the bezel, the at least one second portion having a surface in direct contact with the display case along the entire periphery of the display case, the at least one portion defining at least a portion of a cavity between the display case and the bezel.

14. The computer display of claim 13, further comprising a camera module, wherein
    the bezel frame includes a first portion defining a first cavity including a cable associated with the camera module, and
    the bezel frame includes a second portion defining a second cavity including the camera module.

15. The computer display of claim 13, further comprising an antenna, wherein
    the bezel frame includes a first portion defining a first cavity including a cable associated with the antenna, and
    the bezel frame includes a second portion defining a second cavity including the antenna.

16. The computer display of claim 13, further comprising a microphone module, wherein
    the bezel includes a first hole,
    the bezel frame includes a pocket and a second hole such that the second hole is offset from the first hole, and
    the first hole, the pocket and the second hole define a sound port into the microphone module.

17. The computer display of claim 13, wherein the bezel is affixed to the bezel frame with an adhesive.

18. A method comprising,
    inserting a wire beside a stanchion formed on a display case;
    positioning a bezel frame on the stanchion to form a cavity between the display case and the bezel frame such that the bezel frame extends along an entire periphery of the display case and the stanchion has a surface in direct contact with the display case along the entire periphery of the display case; and
    fixing a bezel to the bezel frame and the display case such that the bezel frame has a surface in contact with the bezel along the entire periphery of the bezel, wherein the bezel frame is entirely in an interior of a computer display including the display case and the bezel.

19. The method of claim 18, further comprising:
before fixing the bezel to the bezel frame, inserting a display panel into a portion of the bezel frame, wherein fixing the bezel to the bezel frame includes covering a frame of the display panel.

20. The method of claim 18, further comprising:
before fixing the bezel to the bezel frame, applying an adhesive to a surface of the bezel frame, wherein the bezel is affixed to the bezel frame by the adhesive.

* * * * *